United States Patent Office 3,514,269
Patented May 26, 1970

3,514,269
PROCESS FOR MANUFACTURE OF DIMAGNESIUM ALUMINOSILICATE FOR MEDICAL USES
Hidetaka Uoda, Shinminato-shi, Matajiro Ohsaka, Daimon-machi, and Minoru Okuda, Toyama-shi, Japan, assignors to Fuji Kagaku Kogyo Kabushiki Kaisha, Kamiichi - machi, Naka - Niikawa - gun, Toyama - ken, Japan, a company of Japan
No Drawing. Filed Jan. 17, 1967, Ser. No. 609,755
Claims priority, application Japan, Jan. 26, 1966, 41/4,734
Int. Cl. C01g 57/00; C01b 33/28
U.S. Cl. 23—315                                4 Claims

ABSTRACT OF THE DISCLOSURE

A process for the manufacture of dimagnesium aluminosilicate for medical use, having the structure OAl—O—Mg—O—Si(O)—O—Mg—O—AlO which comprises reacting one mol of an aqueous solution of sodium metasilicate while stirring with an aqueous solution of a water-soluble magnesium salt and then reacting the product obtained with an aqueous solution of 2 mols of sodium aluminate equivalent to 2 mols of MgO. The product is used in medicine as an antacid.

---

$2MgO \cdot Al_2O_3 \cdot SiO_2 \cdot xH_2O$ is widely used at present as an antacid for treatment of disorders of the digestive tract as an excellent remedy because of its strong neutralizing capacity and buffering effect which is sustained for a long time, since it is not absorbed. Moreover, it does not generate carbon dioxide, avoiding thus the discomfort of belching. It is another advantage that it will not deteriorate when stored for a long time. The process for manufacture of this product known up to now is to react a magnesium salt equivalent to 2 mols of MgO with an aqueous solution of 2 mols of secondary sodium aluminate, and then react the product thus obtained with 1 mol of metasodium aluminate. The precipitate formed by the reaction is washed for purification by decantation. The abovementioned chemical reaction is illustrated by the following equations:

$Al_2(SO_4)_3 + 10NaOH \rightarrow 2Al(OH)(ONa)_2 + 3Na_2SO_4$ $2Al(OH)(ON)a)_2 + 2MgCl_2 \rightarrow 2Al(OH)O_2Mg + 4NaCl$ $2Al(OH)O_2Mg + Na_2SiO_3 \rightarrow MgO_2 \cdot Al \cdot SiO_3Al \cdot O_2 \cdot Mg + NaOH$ As shown in the abovementioned equations, 2 mols of caustic soda are produced as by-product for each mol of the final product in this case.

Moreover, the dimagnesium aluminosilicate precipitate contains of the accumulated particles of fine size, and its sedimentation rate is very slow; moreover, due to its strong adsorptive capacity, the caustic soda produced by as by-product is firmly held, and not readily released, thereby requiring a huge volume of water, a great deal of labor and a long time for the purification of the product, which is a serious bottleneck for its industrial production.

It is, therefore, the object of the present invention to overcome the above mentioned drawbacks and to find a simplified and economical process for producing dimagnesium aluminosilicate. The dimagnesium alumino silicate made according to the old method has the following structure:

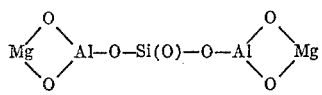

in this compound Mg is in end positions. This structure has been changed in the newly synthesized dimagnesium alumionsilicate, which has the following novel structure:

OAl—O—Mg—O—Si(O)—O—Mg—O—AlO wherein Mg stands between the aluminate salt and silcate salt. However, the antacid effect of the compound is not lower than that of the old compound.

The process of this invention consists in reacting while stirring an aqueous solution of 1 mol of metasodium silicate with an aqueous solution of a water-soluble magnesium salt equivalent to 2 mols of MgO e.g. an aqueous solution of magnesium chloride and/or magnesium sulfate, with the compound obtained thereby, an aqueous solution of 2 mols of sodium aluminate is thereafter reacted with or without heating; or, alternatively, 2 mols of sodium aluminate produced during the reaction process are so reacted. This reaction is illustrated below:

$2MgCl_2 + Na_2SiO_3 \rightarrow ClMg—SiO_3—MgCl + 2NaCl$ $Al_2(SO_4)_3 + 8NaOH \rightarrow 2Al(OH)_2ONa + 3Na_2SO_4$ $ClMg—SiO_3—MgCl + 2Al(OH)_2ONa \rightarrow AlO_2$
$—Mg—SiO_3—Mg—AlO_2 + 2H_2O + 2NaCl$ The principle of the process of this invention is to react a water-soluble magnesium salt equivalent to 2 mols of MgO and 1 mol of sodium metasilicate with each other to convert them into the salt corresponding to the composition of magnesium silicate of the mineral acid, forming the anion of the Mg-salt, with which 2 mols of sodium aluminate are thereafter reacted to make the double decomposition take place.

Sodium metasilicate employed as raw material in the process of this invention is obtained at a low price simply by adding caustic soda to commercial sodium silicate and adjusting the ratio of $SiO_2$ to $Na_2O$ at 1:1; and sodium aluminate is produced during the reaction process by adding 8 mols of caustic soda to water-soluble aluminum salt e.g. an aqueous solution of aluminum chloride or aluminum sulfate per 1 mol of $Al_2O_3$ for the reaction, thereby making it possible to simplify the operation considerably. This reaction is carried out satisfactorily even at normal temperature, but the time of reaction is considerably reduced by heating. However, when heated too high, the product turns to be hard and of heavy quality, and its antacid effect is adversely affected. It is therefore desirable that the temperature in heating does not exceed 70° C. Because of the fact that the various raw materials are employed stoichiometrically in the process of this invention, as it is apparent from the reaction equations described above, the completion of the reaction can be readily observed by the change of liquid phase. The reaction precipitate is filtered, washed to remove the impurities formed as by-product, and when dried and milled, the dimagnesium aluminosilicate equaling to a composition of $2MgO \cdot Al_2O_3 \cdot SiO_2 \cdot xH_2O$ is obtained as a while amorphous powder of fine particle size.

The dimagnesium aluminosilicate thus obtained, is different from the dimagnesium aluminosilicate known before in the structural combination, and as mentioned above is a compound of the novel structure, wherein Mg stands in between the aluminate base and the silicate base. Further, it is almost completely dissolved in 0.1 N hydrochloric acid and has an excellent acid-neutralizing capacity and buffering action, identical to the product prepared by the old method.

The following table shows the comparison between both products in regard to the amount in milliliter of 0.1 N hydrochloric acid consumed by 1 gram each of the products and the results of Fuch's test.

| Acid-consuming | capacity | Fuch's test | TIME (min.) | | | | | | | | | | |
|---|---|---|---|---|---|---|---|---|---|---|---|---|---|
| | | | 1 | 3 | 5 | 10 | 20 | 30 | 40 | 50 | 60 | 70 | 80 |
| New product | 273 ml | pH | 3.5 | 3.5 | 3.8 | 4.0 | 3.8 | 3.7 | 3.6 | 3.5 | 3.3 | 2.8 | 2.0 |
| Old product | 265 ml | pH | 3.6 | 3.7 | 3.7 | 3.8 | 3.6 | 3.4 | 3.3 | 3.2 | 3.0 | 1.8 | |

As explained above, the product having exactly the same favorable properties as the old product is obtained by the process of the present invention, which, however, has the following advantages in comparison with the old method:

(1) The reduction of the reaction time: The reaction of the old method is a reversible reaction; 2 mols of caustic soda formed as by-product during the progress of the reaction must be successively neutralized, washed out and eliminated out of the reaction before it is completed, thereby requiring an extremely long time and much effort to complete the reaction. Contrary thereto, the process of this invention belongs to the type of reaction called double decomposition of the neutral salts; and since all components needed to carry out the reaction are stoichiometrically employed, the reaction is simple and completed in an extremely short time.

(2) Easy purification: As described above, the compound dimagnesium aluminosilicate made according to the invention is a precipitate comprising the accumulation of fine particles, and the sedimentation rate is very slow. Furthermore, due to its strong adsorptive capacity, it firmly holds the reaction by-products, especially caustic soda and does not release them easily. As a consequence, the purification in the old process is the greatest obstacle for the industrial production. However, since no caustic soda hard to remove is formed as by-product by the process of this invention, the purification becomes much simpler and the required amount of water, labor and the time spent can be considerably cut down, which is again lower, reflected in the manufacturing costs.

(3) Increase of the yield and the uniform quality: As described above, the old process is carried out in an alkaline medium of caustic soda and the caustic soda formed as by-product is successively washed out to be removed so that the reaction may progress, while a great deal of silicate and aluminum are washed away, thus inevitably involving a decrease of the yield as well as unevenness of the compostion. On the other hand, the process of this invention is different from the old one as to the reaction method and no components are washed away. Therefore, the yield is not only improved, but the composition remains uniform and it becomes very easy to control the quality.

(4) Cutting down the cost of raw materials: Whereas the amount of the caustic soda needed to produce 1 mol of dimagnesium aluminosilicate from the aluminum salt employed as raw material is 10 mols in the old method, 8 mols are enough in the process of this invention, which means, the amount of caustic soda standing first in the cost of the necessary raw materials for producing the compound described can be cut down by 20 percent compared to the old method. This spells an important economic advantage.

As above mentioned, the dimagnesium aluminosilicate of the novel chemical structure having exactly the same component ingredients and favorable properties as the old one can be very easily and economically produced by the process of this invention. It is for this reason that this invention spells a definite improvement as a process for the manufacture of dimagnesium aluminosilicate for medical use. The following examples further illustrate the method according to the invention.

EXAMPLE 1

To the mixture of 200 ml. of water with 103 g. of sodium silicate for industrial use containing 29.1% $SiO_2$ and 9.3% $Na_2O$, 107 ml. of 27% v. caustic soda solution are added and further 615 ml. of magnesium chloride solution containing 15.5% v. MgCl are added dropwise with vigorous agitation for about an hour and a half. Thereafter, to the thus obtained mixture, sodium aluminate solution comprising 297 g. of aluminum sulfate containing 17.2% $Al_2O_3$, 900 ml. of water and 595 ml. of 27% v. caustic soda solution are added for about one hour and a half, while being heated. When keeping the temperature at 65°–70° C. overnight and continuing to stir, the liquid phase turns nearly neutral. A precipitate is thus produced wihch is filtered and washed to remove the impurities, and which when warmed up to 65° C. and milled, yields 195 g. of white amorphous powder. Loss on ignition of the product is 39.54%, the ratio of MgO to $Al_2O_3$ to $SiO_2$ is 2:1:1; 273 ml. of 0.1 N hydrochloric acid are needed to neutralize 1 gram of the product dried at 105°–110° C. to constant weight.

EXAMPLE 2

To the mixture of 103 g. of sodium silicate for industrial use containing 29.1% $SiO_2$, 9.3% $Na_2O$ with 200 ml. of water, 107 ml. of 27% v. caustic soda solution are added and further 382 ml. of magnesium sulfate solution containing 31.51% v. $MgSO_4$ are added dropwise with vigorous agitation for about one hour and a half, thereafter 595 ml. of 27% v. caustic soda solution are quickly added with stirring and to the thus obtained mixture the solution comprising 900 ml. of water with 297 g. of aluminum sulfate containing 17.2% $Al_2O_3$ is added dropwise for about one hour and a half. When repeating the same procedure as Example 1, 196 g. of the product, whose loss on ignition is 40.04% and acid-neutralizing capacity is 268 ml. are obtained.

What we claim is:

1. A process for the manufacture of dimagnesium aluminosilicate for medical use, having the structure OAl—O—Mg—O—Si(O)—O—Mg—O—AlO which comprises reacting one mol of an aqueous solution of sodium metasilicate while stirring with an aqueous solution of a water-soluble magnesium salt and then reacting the product obtained with an aqueous solution of 2 mols of sodium aluminate equivalent to 2 mols of MgO.

2. The process as claimed in claim 1, wherein the sodium aluminate is formed in situ.

3. The process as claimed in claim 1, wherein the water soluble salt of magnesium is the chloride or sulfate.

4. The process according to claim 1 wherein the reaction with the sodium aluminate solution is conducted at 65°–70° C.

References Cited

UNITED STATES PATENTS 3,302,394   5/1962   Ishino et al. _____ 23—110

FOREIGN PATENTS 614,384   2/1961   Canada.

OSCAR R. VERTIZ, Primary Examiner

H. S. MILLER, Assistant Examiner

U.S. Cl. X.R.

23—113; 424—156